UNITED STATES PATENT OFFICE.

CARL FRIEDRICH WILHELM STELZER, OF BERLIN, GERMANY, ASSIGNOR TO DR. GRAF & CO., OF SAME PLACE.

PROCESS OF MAKING OZONE-WATER.

SPECIFICATION forming part of Letters Patent No. 420,394, dated January 28, 1890.

Application filed November 5, 1889. Serial No. 329,327. (No specimens.)

*To all whom it may concern:*

Be it known that I, CARL FRIEDRICH WILHELM STELZER, of the city of Berlin, in the German Empire, have invented a certain new and Improved Process for Producing Ozone-Water in which the ozone is retained for a considerable period without alteration, of which the following is a specification.

My invention relates to a process for producing ozone-water in which the ozone is retained for a considerable period without alteration.

I am aware that ozone-water has been produced before the date of my application by allowing ozonized oxygen to so pass through a quantity of water that the ozone becomes absorbed by the same. Such said ozone-water has the smell and taste of ozone and produces the reactions of the same, but cannot be retained in its original state for any length of time, as the ozone will in a short time—generally a few hours—be reconverted into ordinary oxygen. If, however, a small quantity of hydrochloric acid or hydrochloric acid with the addition of a small quantity of a chloride—such, for instance, as chloride of sodium, chloride of magnesium, and the like—is or are added to the water by which the ozone has been absorbed—*id est*, ozone-water—or to the water before it is caused to absorb ozone, such ozone-water will retain all its properties for almost a year, and especially so when care is taken to store the fluid in dark bottles and in a dark place in the cellar or otherwise.

What I desire to secure by Letters Patent is—

My improved process for producing ozone-water which will retain all its properties for a considerable length of time, by adding a small quantity of hydrochloric acid or hydrochloric acid with a chloride, substantially as and for the purpose set forth.

In witness whereof I have hereunto signed my name in the presence of two subscribing witnesses.

CARL FRIEDRICH WILHELM STELZER.

Witnesses:
ANTHONY STEFFEN,
WILHELM VOGT.